United States Patent [19]

Bocchi

[11] 4,086,434
[45] Apr. 25, 1978

[54] REMOTE CONDITION REPORTING SYSTEM

[75] Inventor: Quinto M. Bocchi, Minneapolis, Minn.

[73] Assignee: Leo P. Christiansen, St. Paul, Minn.; a part interest

[21] Appl. No.: 721,319

[22] Filed: Sep. 7, 1976

[51] Int. Cl.² .......................................... H04M 11/04
[52] U.S. Cl. ............................. 179/2 AM; 179/5 R; 340/151
[58] Field of Search ................. 179/2 R, 2 A, 2 AM, 179/5 R; 340/150, 151, 152 T, 163, 164 R, 164 B

[56] References Cited

U.S. PATENT DOCUMENTS

| 3,390,234 | 6/1968 | Glidden | 179/5 R |
|---|---|---|---|
| 3,553,376 | 1/1971 | Bogaart | 179/2 AM |
| 3,588,357 | 6/1971 | Sellari | 179/2 AM |
| 3,842,208 | 10/1974 | Paraskevakos | 179/5 R |
| 3,883,695 | 5/1975 | Bickel | 179/5 R |
| 3,922,490 | 11/1975 | Pettis | 179/2 AM |

Primary Examiner—Kathleen H. Claffy
Assistant Examiner—Joseph A. Popek
Attorney, Agent, or Firm—Merchant, Gould, Smith, Edell, Welter & Schmidt

[57] ABSTRACT

A remote condition reporting system for use in a home, for example, includes a microprocessor with memory and a firmware program, telephone dialing equipment, a clock and a plurality of inputs to receive utility meter readings and/or the outputs of alarm condition sensors. The system initiates calls to utility company central offices at predetermined intervals to report utility usage, including time of day power usage metering and the system also can automatically and immediately initiate a call to the appropriate authorities i.e., fire department, police department, etc., in response to an alarm condition. Data keyboard terminal means also permits electronic fund transfer communication between the home unit and a bank.

11 Claims, 12 Drawing Figures

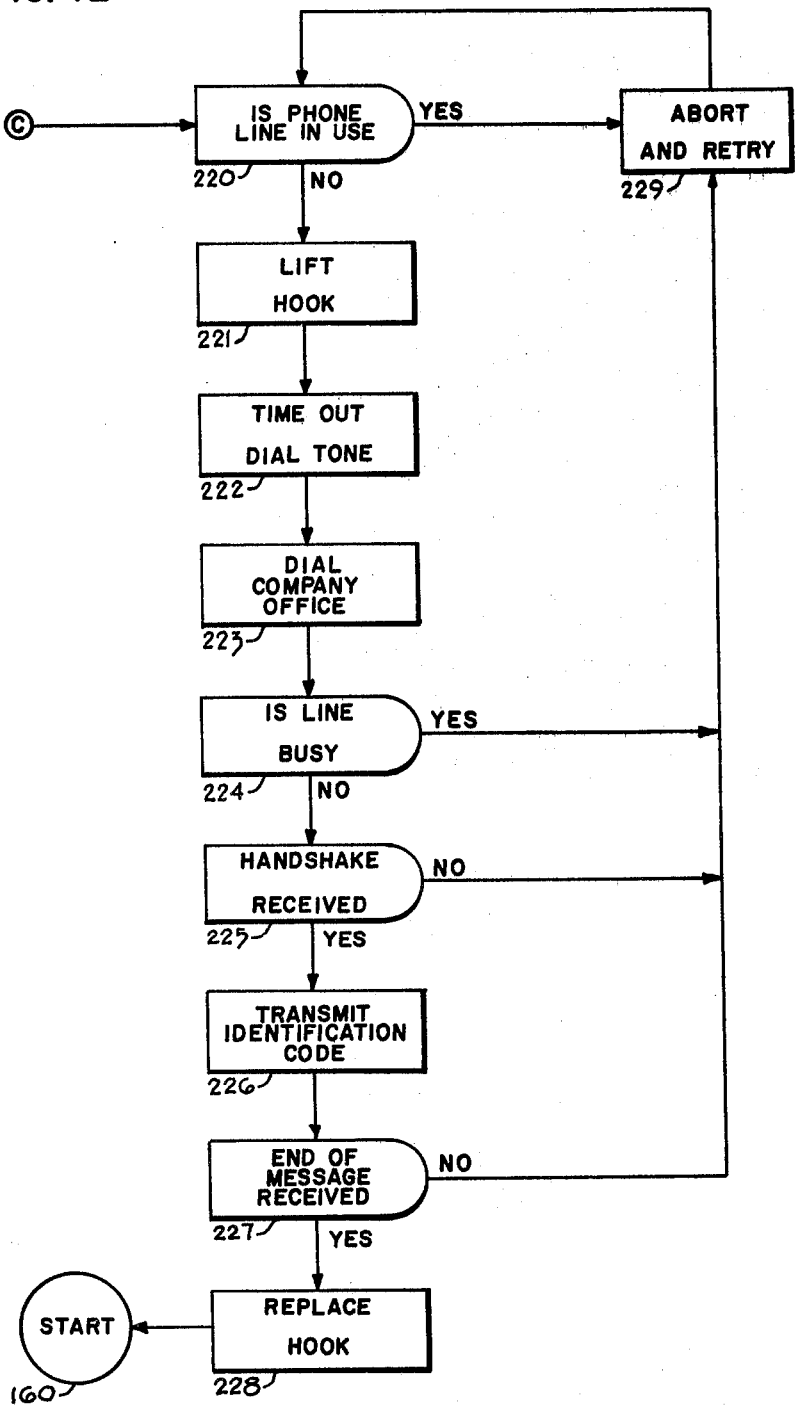

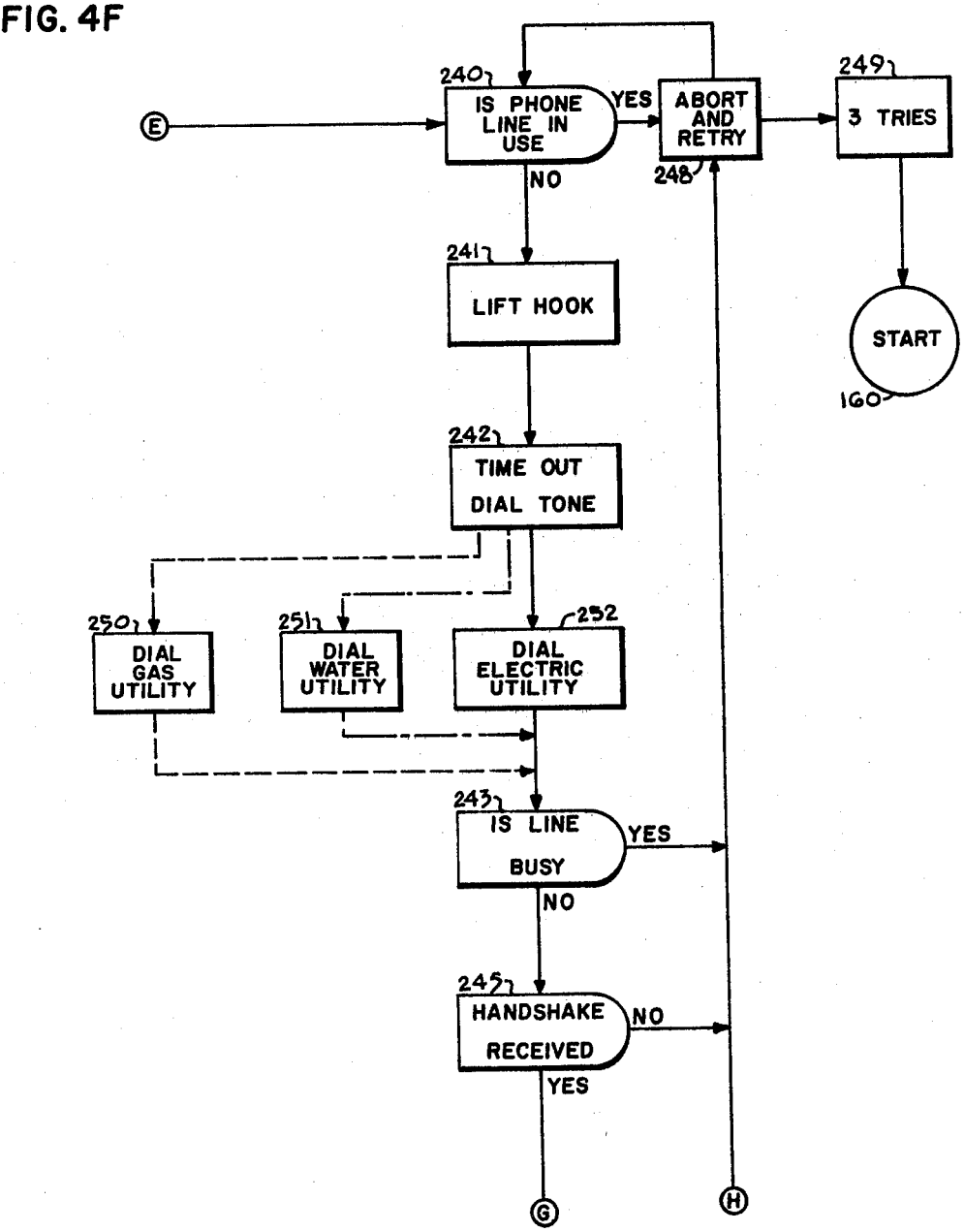

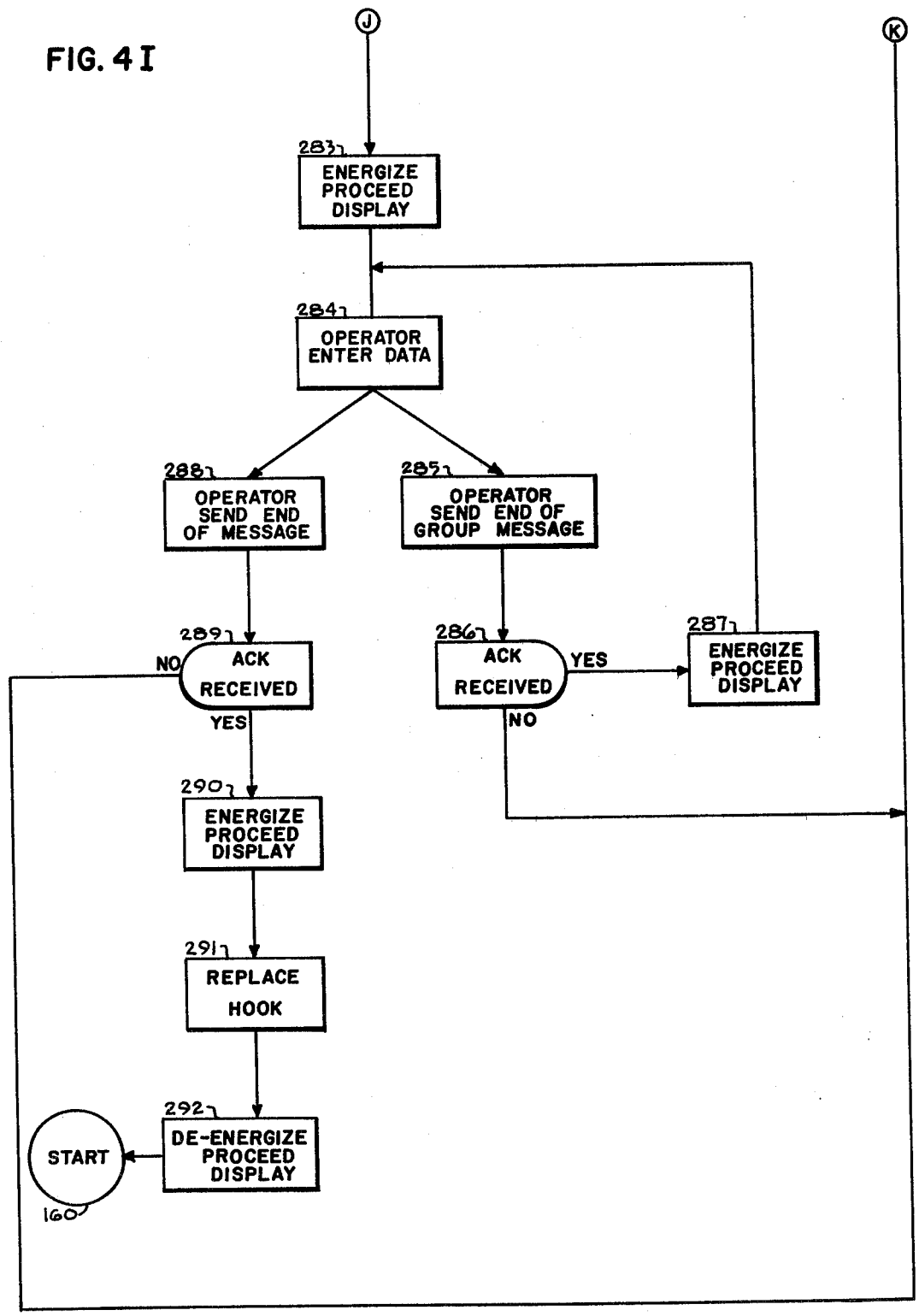

REMOTE CONDITION REPORTING SYSTEM

BACKGROUND OF THE INVENTION

The present invention pertains to the field of remote condition reporting apparatus. More specifically, the present invention pertains to automatic apparatus for installation at a home or other location remote from utility company and emergency service headquarters, for automatically reporting utility usage information for billing purposes, and for automatically reporting the occurrence of an emergency condition such as fire, burglary, power outage or the like.

Many systems have been composed in recent years for the automatic reading of utility meters, with the intended object of providing more up-to-date information and for eliminating the high labor costs involved in door-to-door meter reading, as well as the occasional inconvenience to customers. However, despite the great number of systems and devices which have been proposed in the prior art, and the many patents granted thereon, none of these systems have come into widespread use. Except for a few small scale experimental usages, automatic meter reporting systems have been limited to large scale industrial users where it has been feasible to install expensive equipment, dedicated leased telephone lines and the like.

However, systems for installation in homes must deal with additional constraints. For one thing, the cost of the equipment to be installed in each home must be low enough so that it is economically feasible and advantageous for a utility company to make the initial investment, as compared with the labor costs involved in door-to-door meter reading. For another thing, the equipment installed at the home must be compatible with normal home telephone usage and normal home telephone line service. Obviously any system which unduly interferes with the normal flow of outgoing and incoming calls to the home would be unacceptable to the consumer and to the telephone company. On the other hand, any system which requires the installation of special or additional lines to each home or the addition of special switching equipment at the telephone office is objectionable from a cost viewpoint. Further, to justify the expense involved with the home reporting units, they should be flexible enough in design to permit reporting of different types of data to different destinations, and they should permit easy adaptation or modification for adding additional services or functions as they may be developed, without having to make obsolete and replace all home units.

Most prior art reporting systems involve polling or interrogating home units from a central office computer. In such systems, special equipment installed at, for example, a power company would sequentially dial-up each customer's phone on a monthly basis, and a reply unit at the home would upon command send out coded data corresponding to the meter reading. One problem with this type of system is the problem of the ringing of the home phone during the machine interrogate process. If the customer's phone is allowed to ring on a meter reading interrogation call, this presents a constant source of nuisance to the customer. Additionally, if the customer answers the phone while data is being transmitted, it may interrupt such transmission and necessitate the repetition of the call, thereby creating further nuisance. It is for this reason that most telephone companies have adopted operating rules which prohibit usages which would create nuisance ringing at the customer's phone.

Systems have been proposed which avoid the ringing of the customer's phone by accessing the test train of the telephone system network. Although this approach would avoid the problem of nuisance ringing at the home, it suffers a number of disadvantages. For one thing, there is the additional expense involved in installing equipment to access a test path. Another problem is that this additional equipment must be at the telephone company's central office, rather than at the office of the utility company involved. This creates another problem, that of coordinating use of the equipment by more than one utility. For these reasons, these types of systems have not been widely adopted.

Other types of prior art devices would attempt to avoid the nuisance ring problem by suppressing the first ring of the telephone. These systems then present the problem of how to distinguish between ordinary telephone calls and those from the utility company, so that the ring can be restored for ordinary calls. The application of a device of this type would require suppression of the first ring of every incoming call, and this practice is generally against the operating rules of most telephone companies.

Other systems have sought to avoid the above problems by initiating the reporting call from the home, rather than from the utility company office. However, the prior art systems thus proposed have certain disadvantages, including the difficulty of precisely controlling the time of day or night or the exact day of the month for initiating the reporting call. These systems also involve unnecessary complexity and they lack the flexibility to provide for reporting a plurality of different functions on different reporting periods.

In addition, the initiation of time of day billing rates for normal and for peak power periods in many parts of the country have further complicated the requirements of home reporting systems, which are now required to report both on-peak period usage and off-peak period usage.

SUMMARY OF THE INVENTION

To overcome these and other problems in the prior art, the present invention provides an automatic remote condition reporting system that is low in cost, capable of using conventional home telephone service with minimum or no interruption thereto, and is flexible enough to permit easy tie in of multiple reporting functions. For example, the system can be installed initially for reporting a given utility to the appropriate office. Later, if other utilities subsequently acquire their own central office equipment for automated reporting and billing, only a relatively simple and inexpensive modification to the memory of the home unit is required to accommodate the additional function. Thus, initial adoption of the system is not dependent upon full agreement and cooperation amongst the various utilities at the outset, which for various reasons may not be economically feasible.

According to the present invention there is provided a remote unit for use in conjunction with one or more central office data handling or accumulating systems, comprising a microprocessor including memory and a firmware program, a plurality of inputs for receiving data from utility meters or alarm condition sensors, telephone interface equipment including dialing means for initiating a call, and in the case of utility reading reporting, clock means for accurately timing the time of the reading and the initiation of the reported call at the predetermined time.

According to another aspect of the present invention, the emergency condition reporting can include means for receiving burglar alarm inputs of fire or smoke detector inputs, whereby the system responds by placing calls to the appropriate police or fire department, from telephone numbers stored in memory. Automatic reporting of the address of the home unit experiencing the emergency is also accomplished by readout from memory.

The system is preferably battery operated, with a low power charger from the normal base house current, so that it is not rendered inoperative in case of power failure. In case of power failure, means can be provided for automatically calling the power company and reporting the time and location of the failure.

According to another aspect of the present invention, means including an input keyboard can be provided for electronic fund transfer communication with a financial institution with which the home owner is an account holder.

These and other features of the present invention will be explained more fully hereinafter with reference to the description of the preferred embodiment.

DESCRIPTION OF THE PREFERRED EMBODIMENT

Figure 1:
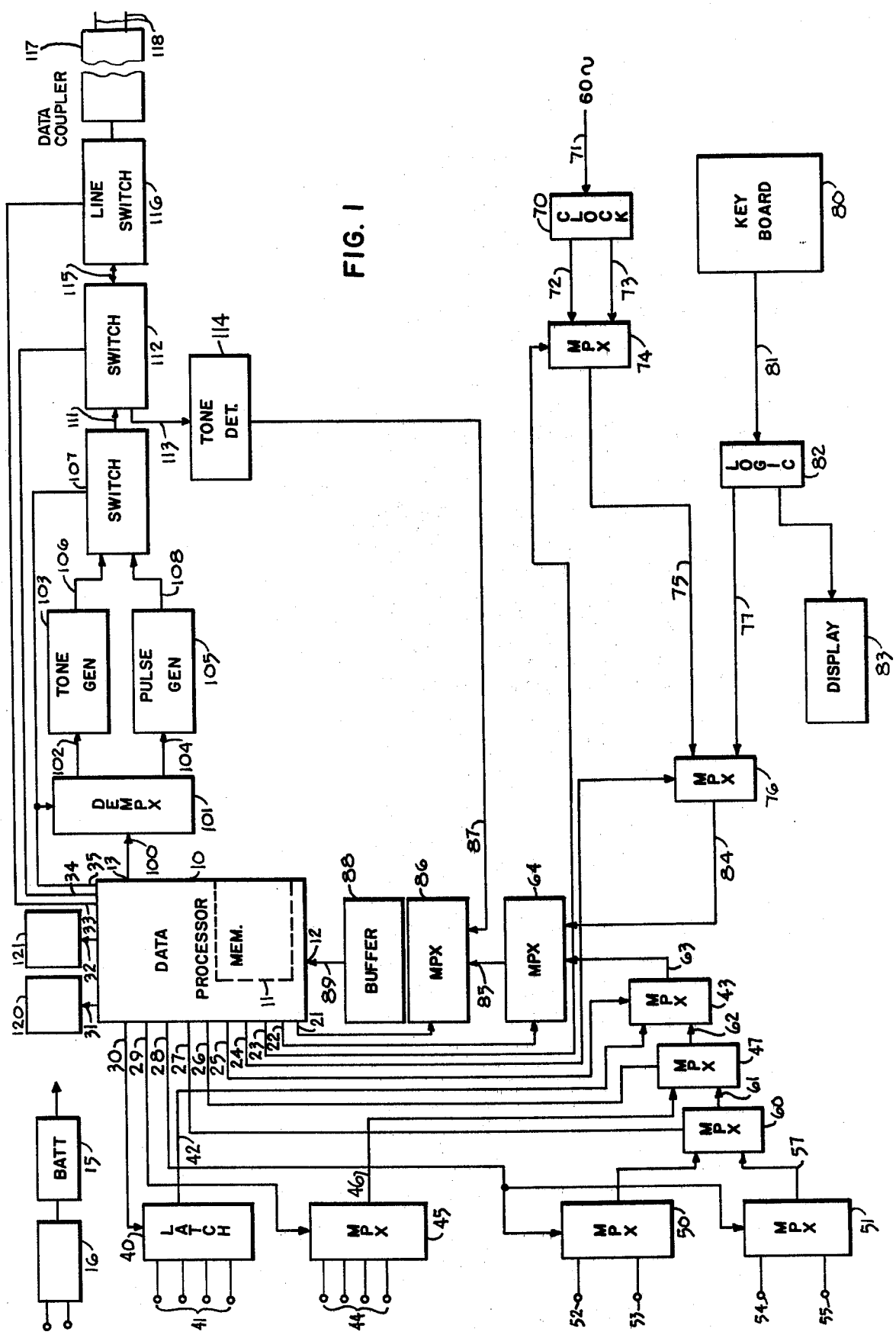
FIG. 1 is a schematic block diagram of a remote condition reporting system according to the present invention.

Referring now to FIG. 1, there is shown a block diagram of the remote data handling and reporting system according to the present invention. The system of FIG. 1 is intended for installation at a home or other utility user, for connection to the utility meters at the home, together with optional connections for sensors for emergency conditions. The system communicates via standard telephone lines to central offices for the various utilities, and also to the appropriate authorities in case of emergency.

The system of FIG. 1 is built around microprocessor or data processor 10. Microprocessor 10 provides the memory, control and sequencing for the operation of the system. Any type of integrated circuit microprocessor can be used, such as those manufactured by Texas Instruments, AMI or others. The microprocessor contains the necessary arithmetic and logic functional blocks for operating the system, as well as memory (indicated by reference number 11) for data handling and for system operation.

Data processor 10 includes two different types of memory. A read only memory (ROM) holds the firmware program for control and sequencing of all operations as described hereinafter. A random access memory (RAM) is used for storing a number of items unique to the particular home location or city. These include all phone numbers to be called, including emergency reporting, utility meter reporting and bank phone numbers. Also included in the RAM is a code number for the identification of the location of the particular home unit.

Real time information designating the day of the month and the time of day that the particular home is to be read for metering of each of the utilities served by the system is also loaded in the RAM. Each home remote unit is preferably set to call at night when there is less likelihood of interruption of normal home phone service, and the home units in a given town or district of a town are set to make their reporting calls on a staggered basis at different times of night and different days of the month so as to even out the traffic at the central office.

Finally, the RAM contains provisions for storing the time of day metering (peak power) data on a daily updated basis, so that separate totals for off peak period and on peak period can be maintained and reported to the electric utility company.

It will be understood that some of these data, for example telephone numbers to be called and code numbers for identification of the remote unit location, could be stored on a memory separate from processor 10, in communication therewith. For example, these data could be stored on a diode matrix which would be accessed by data processor 10.

It will be appreciated that the actual numbers and types of inputs and outputs may be different for microprocessors made by different companies, although the general nature of them is the same. Accordingly, the preferred embodiment of FIG. 1 is not necessarily exclusively directed to any one type of microprocessor, but may be adapted as may be required for different microprocessors. Specifically, the multiplexing of inputs may be revised as is generally known in the art to accommodate different types and numbers of inputs. Likewise, data select or data strobe lines may be multiplexed as is generally known in the art in order to provide the required number of data select functions in a given application, depending upon the number of available data select lines on a given processor. Accordingly, FIG. 1 as illustrative of a number of different possible input/output connections which could be provided according to the present invention.

In FIG. 1, data processor 10 includes a four bit data input 12, and an eight bit data output 13. The processor also includes a plurality of data select lines or data strobe lines numbered 21-36.

Power for operating data processor 10 together with all other components of the system is supplied primarily by a battery 15. For purposes of clarity in FIG. 1, the necessary power connections from battery 15 to each of the elements have been omitted. Battery 15 receives charging current from a power supply 16 which is connected to standard 60-cycle house current lines. Battery 15 provides the capability for the system to remain functional in the event of an electrical power outage. In fact, the system may easily be made operable to automatically call and report the location and time of the power outage, as explained more fully hereinafter.

Data is fed into data processor 10 through inputs 12 from a plurality of sources, by means of a plurality of multiplexer circuits or signal gates which are controlled by the data select lines as follows. A latch circuit 40 is provided for receiving four inputs indicated by reference number 41. These inputs may be connected to contact closure types of utility meters, for example a water meter, gas meter, an electric meter, and a test function. With a contact closure type of meter, an electrical switch closure is provided periodically according to the rate of usage of the metered quantity, but no accumulated total is maintained, at least electronically, in the meter. Latch 40 contains four individual latch circuits which are set by occurrence of a meter closure, then remain set until read and subsequently reset or cleared by a pulse on data select line 30. In this manner, a contact closure will not be lost or missed, if the data processor is busy with another function at the time of occurrence of the closure. Data from latch 40 is fed via data trunk 42 to inputs of a multiplex circuit 43. It will be understood that data trunk 42 actually contains four separate data lines which are shown as a single data trunk in the drawing of FIG. 1, for purposes of clarity.

An additional set of four inputs, indicated by reference number 44 are fed into another multiplexing circuit 45. These four inputs are for connection to contact closure type sensors for detection of emergency conditions. For example, they can be connected to sensors for low water pressure, electrical power failure, a burglar alarm and a fire detector. Data select line 29 from the data processor connects to multiplexer 45 for control of the selection of these data lines. Data trunk 46 connects from the output of multiplexer 45 to the input of another multiplexer 47.

In case an accumulating type utility meter is used having a coded digital readout, this type of data is accommodated by a pair of multiplex circuits 50 and 51. For example, in the case of BCD coding, one BCD digit (four bits) is applied to input 52 to multiplexer 50, and another decimal digit (four more bits) is applied through input 53 to the multiplexer 50. In similar manner, additional data is applied to inputs 54 and 55 which connect to multiplexer 51. Data select line 28 from the processor 10 connects to both multiplexers 50 and 51.

The outputs from multiplexers 50 and 51 connect by data trunks 56 and 57 respectively to inputs of another multiplexer 60, which is connected for control by data select line 27. The output of multiplexer 60 is conveyed by data trunk 61 to the other input of multiplexer 47. Multiplexer 47 is connected for control by data select line 26, and its output is fed over data trunk 62 to multiplexer 43.

Multiplexer 43 is connected for control by data select line 25, and the output from multiplexer 43 is connected via data trunk 63 to one input of another multiplex circuit 64, which is connected for control by data select line 22.

A calendar clock circuit 70 is provided for producing timing signals indicating time of day and day of the month for reporting purposes. For convenience, clock 70 may be connected via lead 71 to 60 cycle house current as a timing reference. The output of clock 70 is conveyed by data trunks 72 and 73 to inputs of another multiplexer circuit 74, which is connected for control by data select line 23. The output of multiplex circuit 74 is connected via data trunk 75 to one input of a multiplex circuit 76, which is connected for control by data select line 24. The other input to multiplex circuit 76 is provided via data trunk 77 which is connected to the output of a keyboard logic unit 82. A keyboard or pad 80 is optionally included as part of the system. A keyboard would be an integral part of the system if the electronic fund transfer mode is included. In this case, the keyboard would also be used to load telephone numbers and other information into the RAM section of the memory. In the event a permanent keyboard is not supplied, a portable plug-in keyboard would be used to enter the required data into the memory when the remote unit is installed.

Keyboard 80 may be of any type, for example, a 16-key array. Contact closures within the keyboard are conveyed to logic unit 82 via data trunk 81. Logic unit 82 translates the keyboard inputs into a four bit code and applies them to data trunk 77. A digital display 83 can optionally be provided, also driven by logic unit 82, for providing a digital diplay of data entered on the keyboard.

The output from multiplex unit 76 is carried by data trunk 84 to another input to multiplex unit 64.

Data selected by multiplex unit 64 is carried by data trunk 85 to a first input of multiplex unit 86, which receives another input on data line 87. Multiplex unit 86 operates under control of data select line 21, and the data selected thereby is passed through a buffer unit 88 if required for signal level and impedance matching, and from there via data trunk 89 to the data input 12 of data processor 10.

The establishing of telephone communications and transmission of data thereby is controlled by the data processor as follows. Eight bit data output 13 is connected via a data trunk 100 to a demultiplex circuit 101 which is connected for control by data select line 35. Demultiplex circuit 101 selects the data path through data trunk 102 to tone generator 103, or through data trunk 104 to pulse generator circuit 105. The output from tone generator 103 is connected by lead 106 to the switching circuit 107, and the output of pulse generator 105 is connected by lead 108 to switch circuit 107. Switching circuit 107 operates under control of data select line 35 to alternately control connection of either the tone generator or the pulse generator through lead 111 to switch 112, and ultimately to the telephone line.

Switch 112 operates under control of data select line 34 for either sending data from the data processor and tone or pulse generators, or for receiving data from the telephone line and directing it through line 113 to tone detecting circuit 114. Switch 112 connects via signal line 113 to the telephone line switch or lift hook control 116. Line switch 116 is connected for control by data select line 33 which in effect controls the lift hook signal for initiating of a call, and the replace hook signal for terminating a telephone connection. Of course ordinary manual operation of the telephone by the residence of the home is not affected by line switch 116, except that interrupts may be permitted in emergency situations. Line switch 116 connects to a data coupler 117 (if required) which connects to the telephone pair 118.

Data control lines 31 and 32 connect respectively to a pair of indicator lamps 120 and 121 which may be provided for use with the optional keyboard and fund transfer mode.

It is apparent that the multiplexing input circuit previously described, including multiplex circuits 43, 45, 47, 50, 51, 60, 64, 74, 76, and 86 can be utilized for data path selection, under control of the data processor, data select lines, so as to present to the data processor, data from the various sources. Specifically, clock information from clock 70, keyboard entries from keyboard 80 and contact closure meter data from inputs 41, emergency condition indicating inputs from input 44, or coded meter readings from inputs 52-55 can be presented to inputs 12 by controlling the state of the various multiplex circuit.

Likewise, data outputs from output 13 can be used to generate tones or alternately to generate pulse trains for use in non-tone telephone exchange. To initiate a call, data select line 33 provides a "lift Hook" to line switch 116 to couple the system to the telephone lines. Switch 112 is set for transmit, and demultiplexer 101 and switch 107 are setup for use in the tone generator or pulse generator as may be appropriate for a given installation.

Data for successive digits of the telephone number are then presented to tone generator 103 or pulse generator 105, whichever has been selected. In the case of tone generator 103, the data may represent coded row and column data to allow tone generator 103 to produce at its output on lead 106, tones for dialing through the phone system. Alternatively, if pulse generator 105 is used, it provides a pulse train output at lead 108 in response to a coded number presented at its input. In this manner, the successive digits of the telephone number are dialed out and the telephone connection is thus established.

Switch 112 then switches to connect the signal path from the telephone lines through lead 113 to tone detector 114. At the same time, multiplex circuit 86 is selected to present data from lead 87 to the data processor. When a telephone connection is established, the cooperating equipment at the central office called sends an acknowledgement signal, called a handshake signal, which is detected at device 114, and receipt of which is passed through lead 87 to the input of the data processor. Once confirmation of establishment of the connection is thus received, the data processor proceeds to select tone generator 103, and send location identification data and meter reading or emergency message signals, etc. to the central location, in whatever data format may be required. Upon completion of a transmission, the remote unit sends an end-of-message signal which is acknowledged by the central office computer. Upon receipt of final acknowledgement, the microprocessor 10 will cause replacement of the hook to break the telephone connection.

In the fund transfer mode, each transaction is acknowledged by the central computer at the financial institution. A proprietary code may be utilized to transmit information in both directions, especially in the case of data transfer in the fund transfer mode. The secret mode will prevent unauthorized use of the system.

Figure 2:
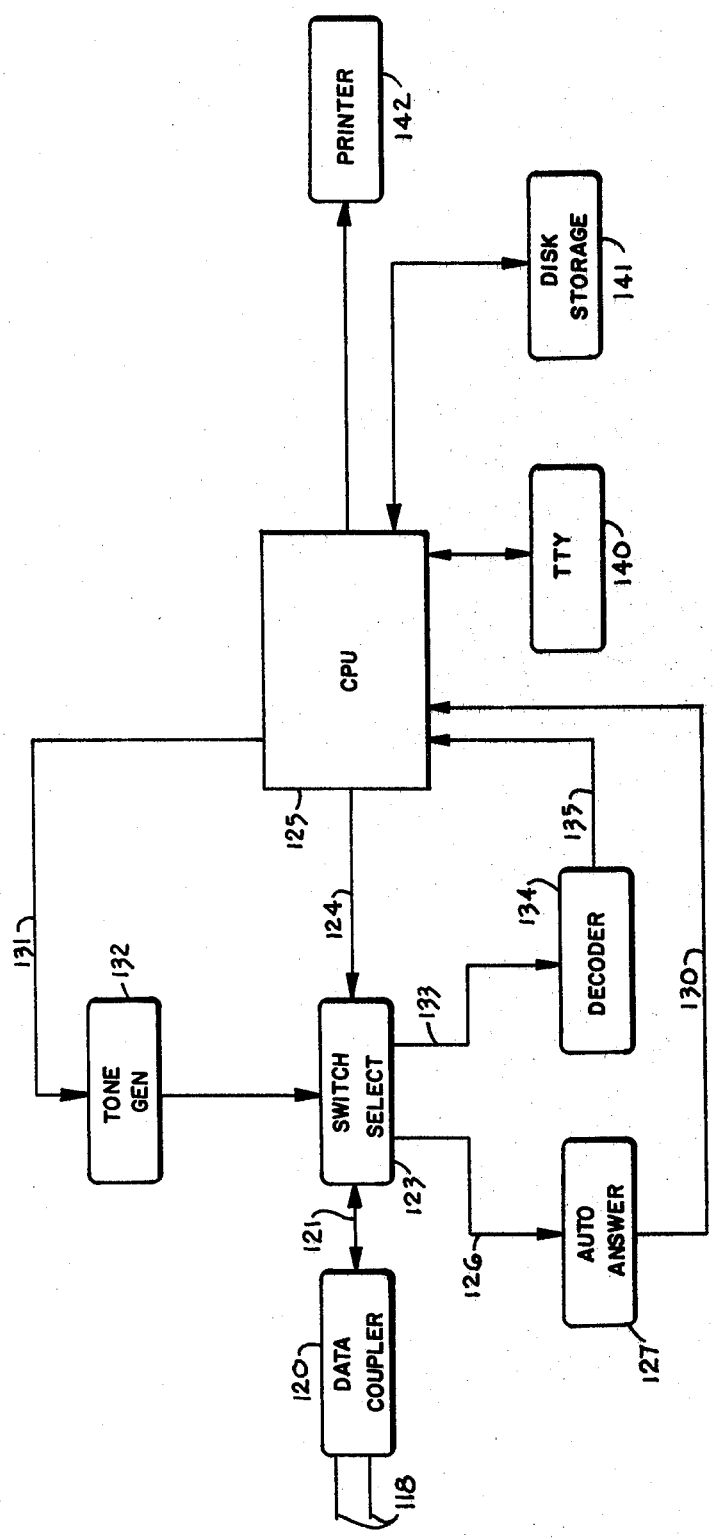
FIG. 2 is a block diagram of a central data receiving station for use with a plurality of remote reporting systems according to the present invention.

FIG. 2 shows in block diagram form a typical central data receiving computer system for use in conjunction with the present invention. The system of FIG. 2 represents a typical installation that might be used at the utility company office, or at a police, fire or other emergency facility office for receipt of reporting calls initiated by the home system of FIG. 1.

In FIG. 2, phone lines 118 from the telephone company are connected into a data coupler 120 and then via a line 121 to a selector switch 123. Selector switch 123 is controlled by control signals on lead 124 from the central processor unit 125 of a computer system. In one switch mode, the telephone line is connected through lead 126 to an automatic telephone answering device 127, which couples via lead 130 to the central processor unit. This allows incoming telephone calls to be answered and the central processing unit 125 to be alerted. Central processor unit 125 then activates tone generator 132 via lead 131 and causes selector switch 123 to connect tone generator 123 to the telephone line. The acknowledgement or handshake signal is then sent. Selector switch 123 is then set up to connect the telephone line through lead 133 to a decoder unit 134 which receives the tone coded data from the home unit. The decoder converts the incoming code to a format for presentation to the Central Processor Unit via data trunk 135.

A teletype unit 140, a disc storage unit 141, and a printer 142 can be provided as desired for storage, processing, and printout of data.

Figure 3:
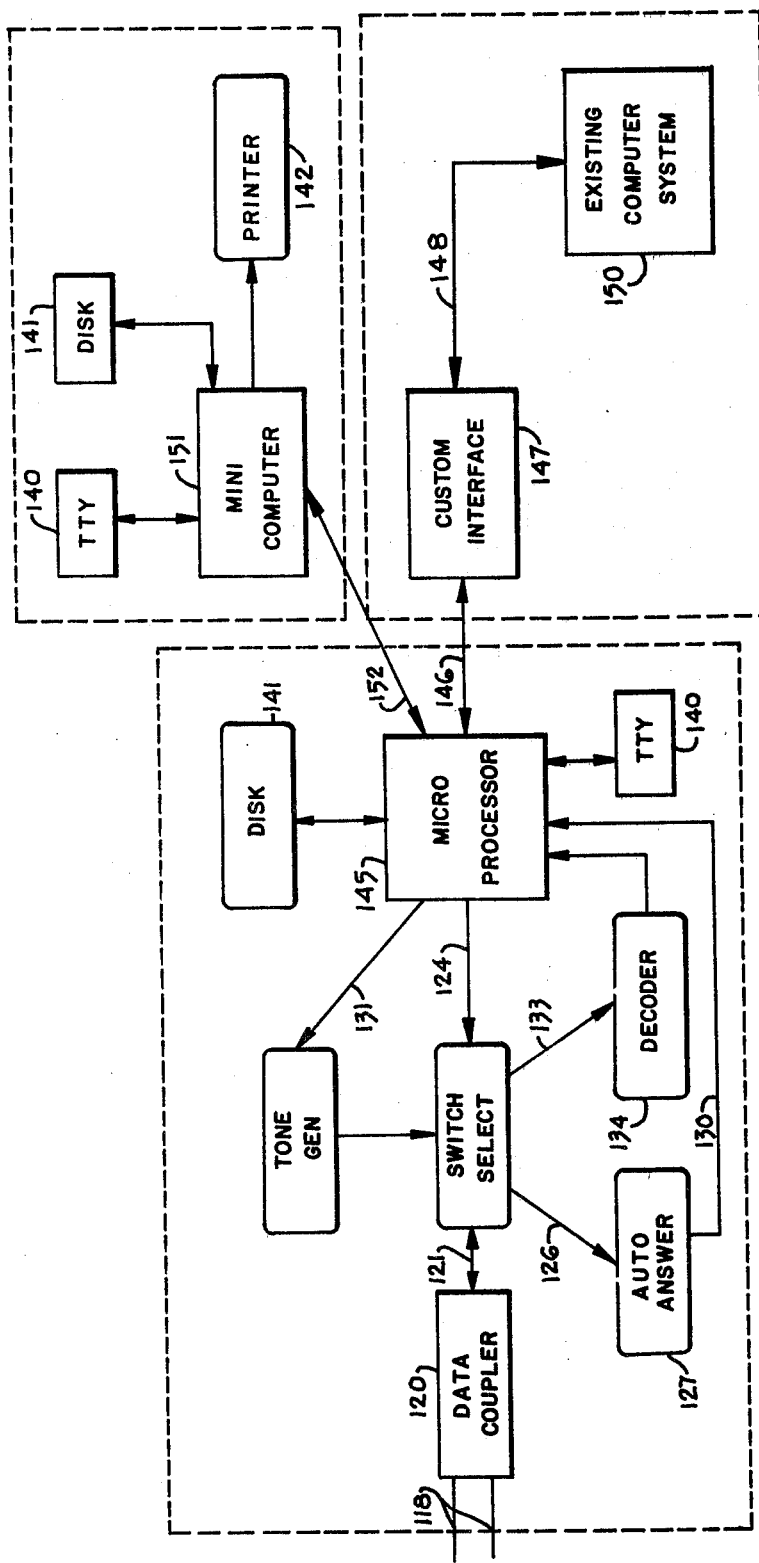
FIG. 3 is a block diagram of a more extensive central data receiving station for use with the present invention.
Figure 4A:
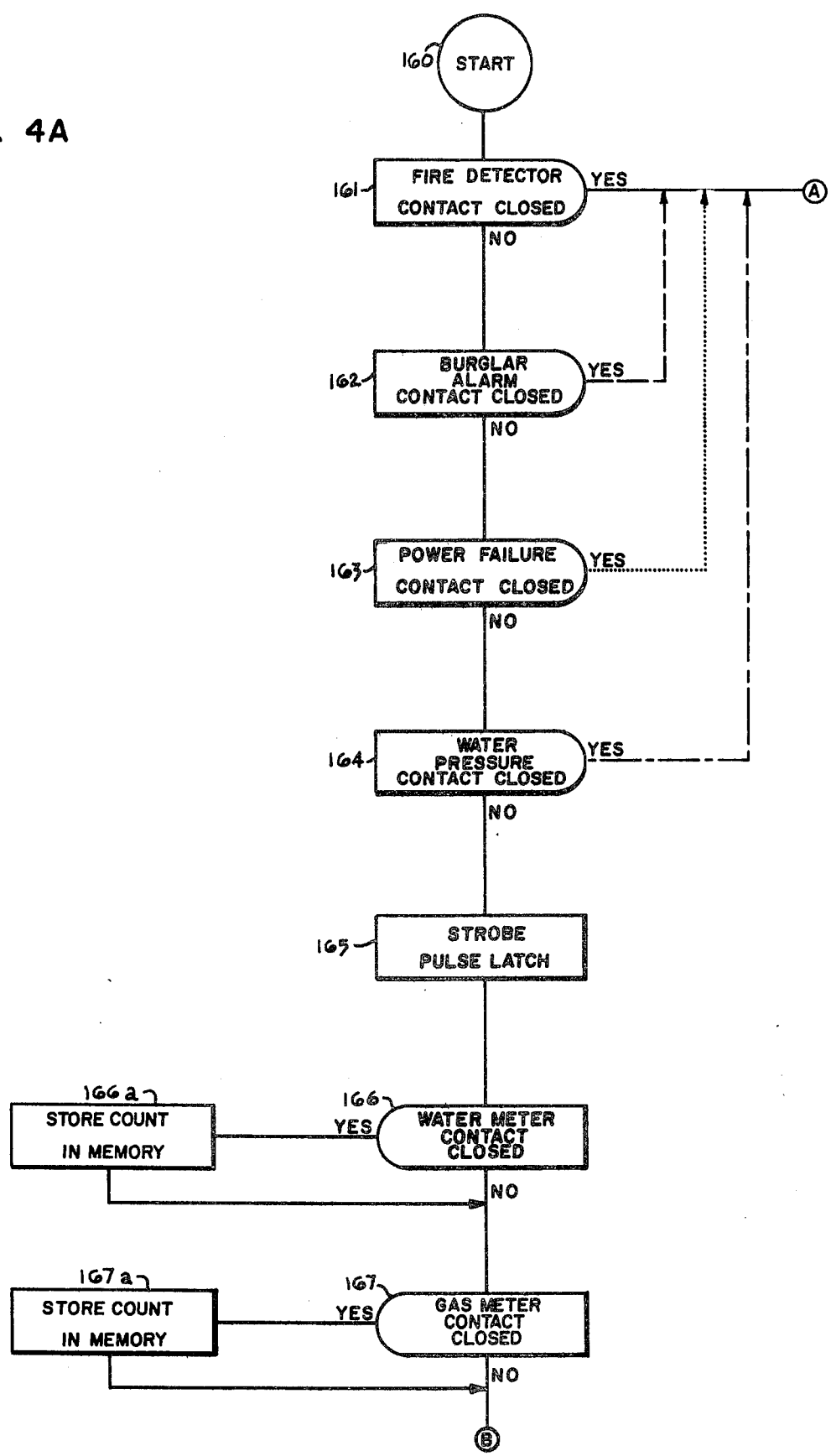
FIG. 4, which includes parts A through I, is a flow diagram illustrating the operation of the present invention.
Figure 4B:
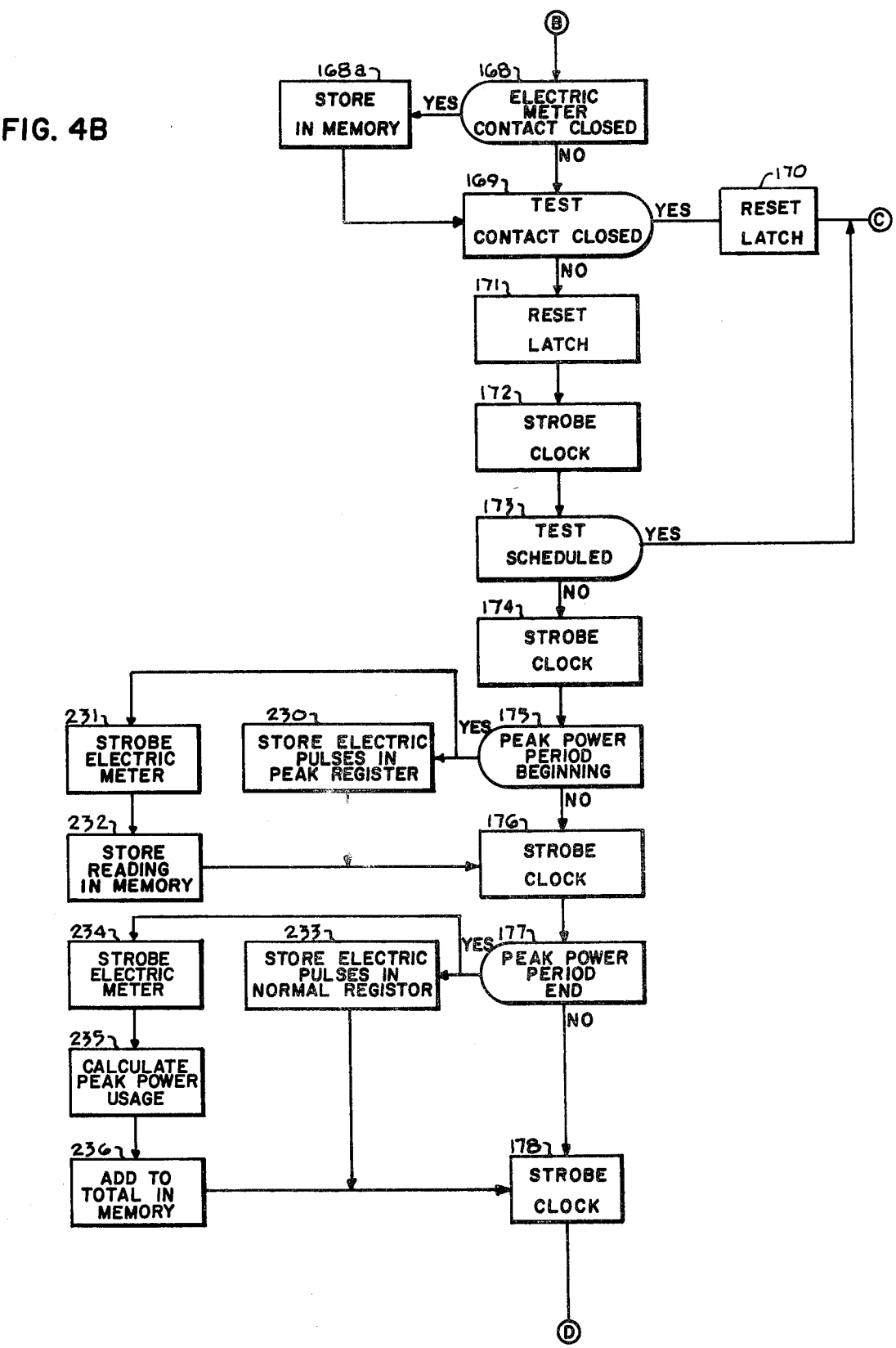
Figure 4C:
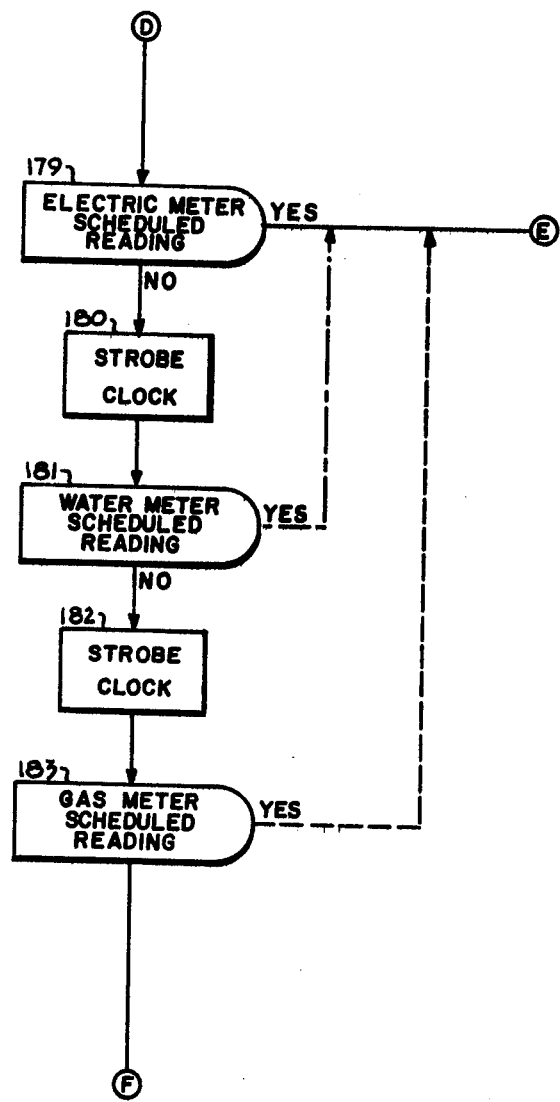
Figure 4D:
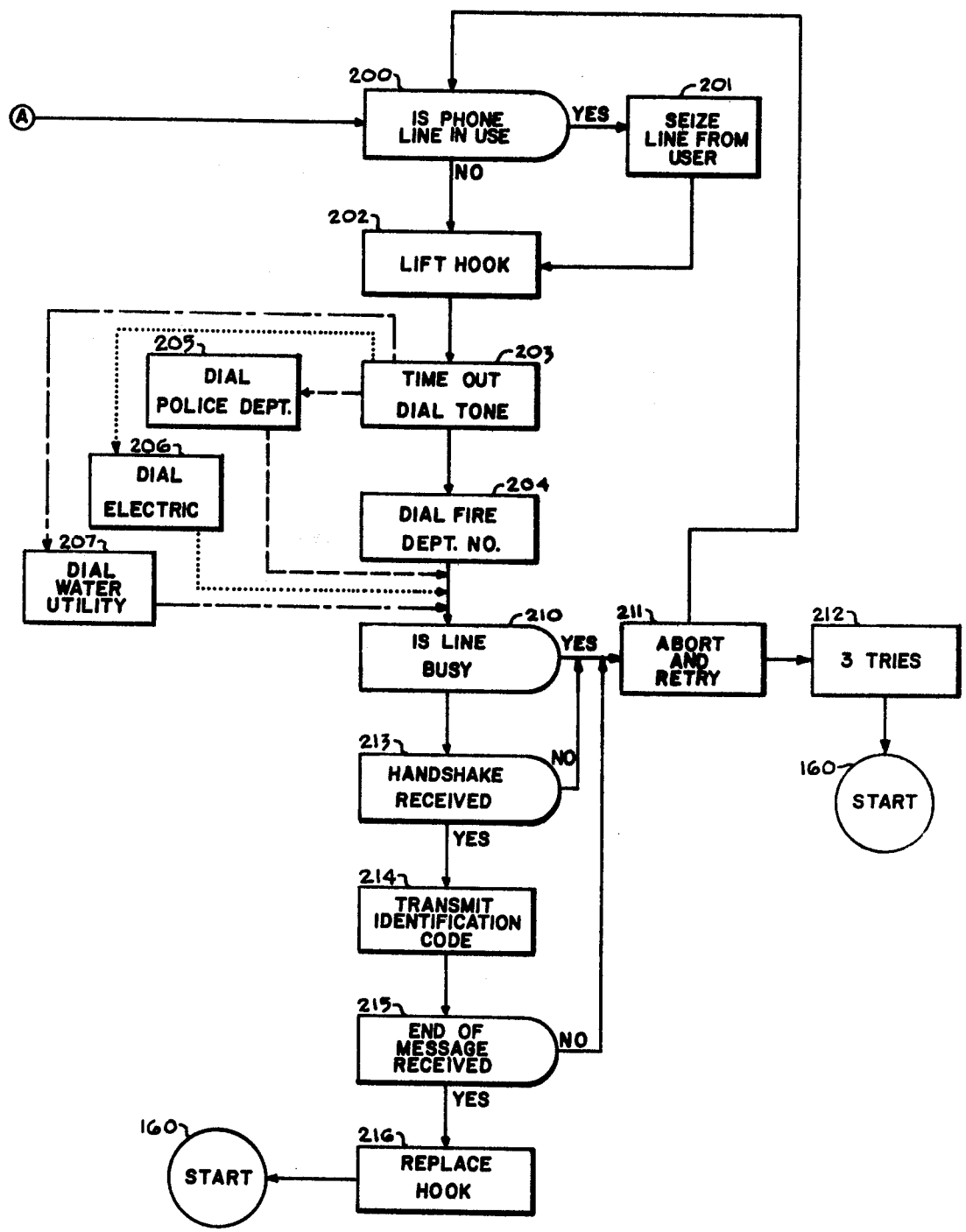
Figure 4G:
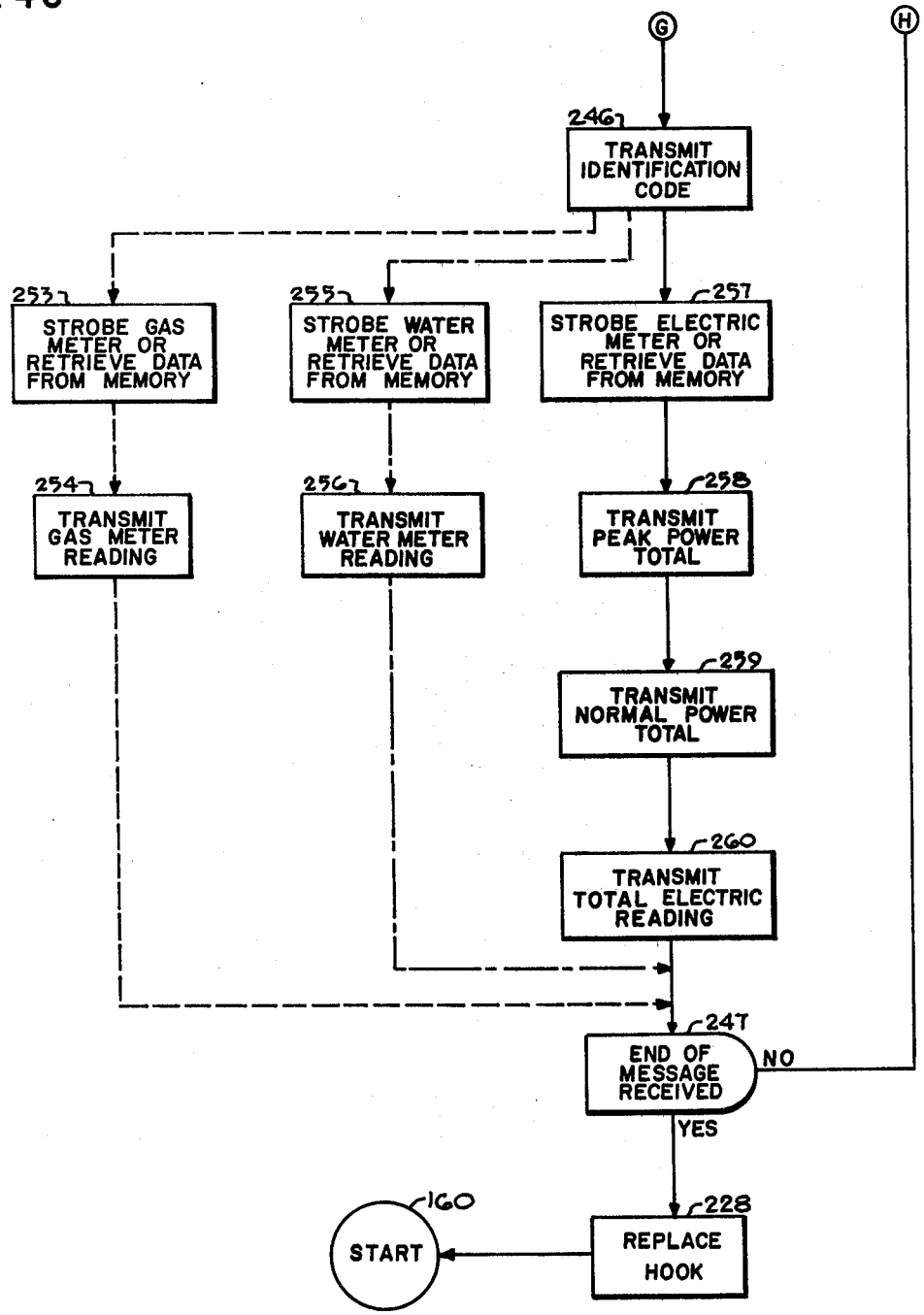
Figure 4H:
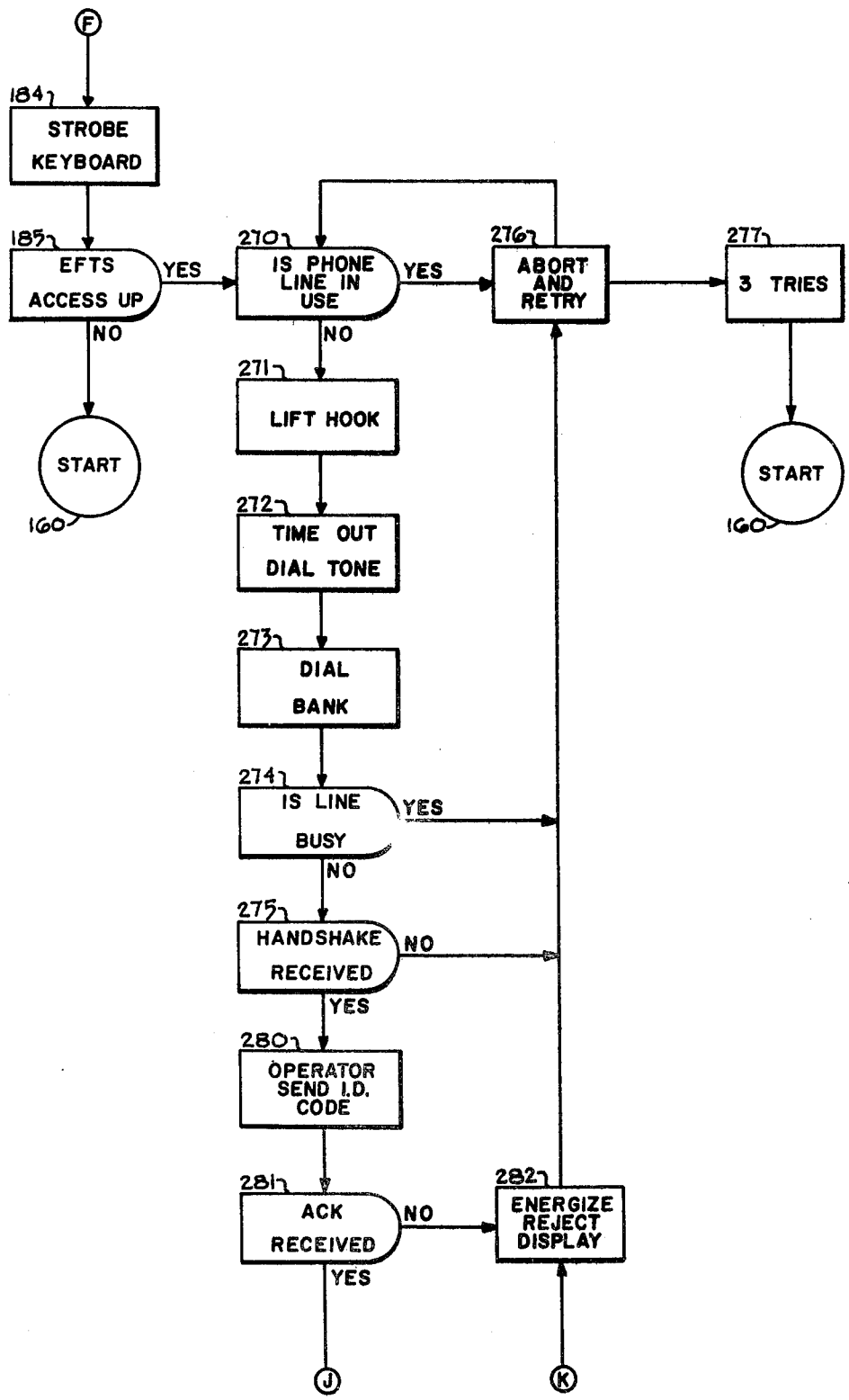

An alternate central computer system is shown in FIG. 3. In this system, the data coupler, tone generator, selector switch automatic answering device and decoder operate as in FIG. 2, but in conjunction with a microprocessor 145 rather than the central processor of a large computer system.

The system of FIG. 3 would be used for example where a utility company already has an existing computer system 150. It is not economically efficient to tie up the existing computer in call answering and data receiving, so microprocessor 145 is provided for this function. Data can be stored within the microprocessor system and the existing computer can obtain information when required via data trunks 146 and 148 and a custom interface 147, if required.

The microprocessor system 145 and associated components could also function as a stand alone unit at a police or fire department of a small city. The microprocessor system can provide essentially the same functions as the system illustrated in FIG. 2 at a lower cost. However, for more sophisticated systems, a mini computer becomes more economically feasible.

If the utility does not have existing computer facilities, a mini computer system including mini computer 151 could be provided. The mini computer system can be programed to handle payroll and accounting functions, for example, in addition to processing utility bills.

Additionally, in the case of an installation at an emergency service headquarters, the printer in either FIG. 2 or 3 can be used to print out the location and nature of the emergency condition being reported, in conjunction with a suitable warning light or alarm device.

The operation of the remote condition reporting system according to the present invention will now be explained with reference to the flow chart comprising FIG. 4. It will be appreciated that the flow chart is only examplary of a number of different operating sequences which could be utilized to achieve the same result. It will further be appreciated that the flow charts have been simplified to illustrate the basic operating principles, but that numerous additional subroutines could be provided as will generally be understood by those skilled in the art. For example, at a number of places in the flow chart, while the processor is waiting for confirmation of a handshake signal, the microprocessor could break and complete one or more sensor scan cycles before returning to the original place in the calling cycle. These breaks have not been shown in the flow chart, in the interest of clarity.

In the flow chart, steps 160 through 185 may be considered a major cycle for the scanning of the various inputs to see whether action is required. The basic scan cycle then branches off into a number of subroutines or calling cycles as may be appropriate.

From the starting point designated by reference number 160, the fire detector contact is interrogated at step 161, the burglar alarm contact is interrogated at step 162, the electrical power failure contact is interrogated at step 163, and the water pressure contact is interrogated at step 164. If any of these steps results in a contact closed situation, an appropriate calling cycle is initiated at point A as will be explained hereinafter. Otherwise, the flow chart proceeds on to examine other inputs.

It will be appreciated that each of these individual steps involves strobing the appropriate data select lines which control the multiplexers, so as to present the reference number 44 inputs from FIG. 1 to the data processor. The appropriate one of these inputs is then examined.

Continuing on in the flow chart, if a NO condition is received for each interrogation, the flow chart proceeds to step 165 which selects the latch which receives inputs 41. The water meter contact is interrogated and if closed, step 166a stores the count in the memory within the data processor. The gas meter contact is then examined at step 167 and if closed, the count is incremented and stored at step 167a. Continuing on through point B, the electric meter contact is then examined at step 168 and if closed, the count is incremented and stored in memory at step 168a. The test contact is then examined at step 169 if closed, the path branches to reset to latch at 170 and then proceed to point C. If the test contact is not closed, step 171 also resets the latch and the clock is strobed at step 172. If a test is scheduled at the predetermined time from storage in memory, a branch to point C follows. If no test is scheduled the clock is strobed and step 175 checks for the beginning of a peak power period. If no peak period is beginning, the clock is strobed and step 177 compares for the predetermined time for the ending of a peak power period.

If the result of step 177 is negative, the clock is strobed and (continuing across point D) memory is consulted at step 179 to see whether an electric meter reading is scheduled. If not, the closk is strobed, and memory is consulted for a predetermined water meter reading schedule. Block 183 likewise compares for the time for a scheduled gas meter reading. If any of steps 179, 181, or 183 are positive, a branch to point E occurs. Otherwise, the keyboard is strobed at step 184 and step 185 determines whether any request for electronic fund transfer system (EFTS) is made. If negative, the system returns on the major scan cycle to the starting point at 160.

If a branch to point A has occurred because of an affirmative result in any of steps 161 through 164, a calling cycle is initiated. The phone line is checked in step 200 to see whether it is in use. If it is in use, the line is seized from the user, assuming that the call has been placed from the home. The line switch is activated at step 202, and step 203 waits a predetermined time interval, for example, three seconds, to insure receipt of a dial tone. The fire department, police department, electric utility company or water utility company is then dialed at step 204 through 207, according to which of steps 161 through 164 initiated the calling cycle, and the flow paths are correspondingly indicated in solid, broken, dotted, and center line, respectively.

Step 210 checks whether the line is busy, and if so a branch to the abort and retry step 211 occurs to reinitiate the calling cycle. After three re-tries, the calling cycle is aborted at step 212 and control returns to the start of the scan cycle 160.

If the line is not busy, receipt of the handshake signal is tested at step 213, after an appropriate delay. If no handshake is received, a branch to the abort step 211 occurs. Otherwise the identification code for the home unit is transmitted at step 214. Receipt of an end of message signal from the central station computer is then tested at step 215, and if not received, a branch to abort and retry 211 occurs. Otherwise, the line switch replaces the hook at step 216, and control returns to the starting point 160.

If either the test contact was closed at step 169 or if a test was scheduled at step 173, a branch to point C would have occurred. From this point a calling cycle is initiated to call the central office of the company supervising the installation and operation of the home units, which may or may not be the same as one of the utility companies. Steps 220 through 229 operate in a manner similar to steps 200 through 216 except that the call is placed to the company office and a test message is sent to the central office and acknowledged. In this manner, the home units perform a self test function and records of the tests are kept in a computer at the central company office to make sure that all home units are operating properly.

If the beginning of a peak power period was indicated in step 175, the next step would have been a branch to step 230, in case a contact closure type of electric meter is used at one of the inputs 41 in FIG. 1, or to step 231, in case an accumulating type meter were used at inputs 52 through 55 in FIG. 1. In either case, the new reading is stored in memory.

At the end of the peak power period at step 177, electric pulses from a contact closure type meter are stored in the normal period register by step 233. If an accumulating type meter is being used, the electric meter is strobed at step 234. The peak power usage, which is the difference between the reading at step 234 and at step 232, is then calculated at step 235. The peak amount is then added to a total or peak period usage at step 236.

If either an electric meter reading, a water meter reading, or a gas meter reading is scheduled, a branch to point E would initiate another calling cycle. Steps 240 through 249 are similar to the calling steps previously described. The gas, water or electric utility is dialed at the appropriate one of steps 250, 251 or 252. The flow paths are indicated in solid, broken or center lines corresponding with the paths from steps 179, 181 or 183.

In the case of a gas reading, the gas meter is strobed at step 253, if from an accumulating type meter applied to inputs such as 52 through 55 in FIG. 1. Alternatively, if from a pulse type meter, the accumulated pulses are retrieved from memory and transmitted at step 254. Similar steps 255 and 256 apply in the case of a water reading.

In case of an electric meter reading, step 257 supplies the current meter data. The peak power total is transmitted at step 258, the normal period power total at step 259, and the total electric reading is transmitted at step 260.

In case of a request for electronic fund transfer service, a branch to step 270 would have resulted from step 185. In this case, a calling cycle is initiated for calling the bank at which the home owner is an account holder. Steps 270 through 277 are identical to steps discussed in the previous calling cycles, except that the phone number for the bank is recalled from memory and dialed at step 273. At step 280, the operator (account holder) transmitts account number and/or personal identification number information by means of keyboard 80. If the numbers sent are valid, the computer at the bank sends an acknowledgement signal which is tested for receipt at step 281. If no acknowledgement is received, indicating an erroneous or otherwise inoperative account number, reject display 120 of FIG. 1, is energized at step 282. In this event, the call is aborted, and another attempt may be made, up to a limit of three tries, or whatever other limit is set. In case of repeated difficulty due to system malfunction, the operator can contact the company's central office by initiating a test calling cycle previously discussed.

If an acknowledgement is received at step 281, the proceed display 121 is energized at step 283. The operator then enters data according to the nature and amount of the particular transaction or plurality of transactions, at step 284. If there are to be more than one transactions, such as a plurality of bank transfers for payment of bills, the operator will send an end-of-group message at step 285, by depressing an appropriate function key on the keyboard. When acknowledgement is received at step 286, the proceed display is energized at step 287, and the path branches back to step 284 so that the cycle can be repeated for another transaction. If acknowledgement is not received, such as due to faulty communications, or a transaction exceeding the account limits, no acknowledgement will be sent by the bank computer, and the reject display will be energized at step 282.

When the last transaction is entered, the operator sends an end of message signal at step 288. Upon receipt of acknowledgement at step 289, the proceed display is energized at step 290 indicating successful completion of the transaction. The hook is then replaced by the line switch at step 291, the proceed display is deenergized at step 292, and control returns to the starting point at 160 for resumption of the scanning cycle.

It will be appreciated that the above described flow chart is merely illustrative of a number of different sequence of operations that are possible with the present invention. It will further be appreciated that individual specialized calling cycles can be added or deleted from the illustrative example shown, as may be required for particular locations or installations.

The present invention thus provides automatic means for remote installation for automatically monitoring and initiating reporting calls to appropriate locations, in the case of emergency, routine utility meter reading reports, or operator initiated request for service or bank transactions.

What is claimed is:

1. A remote condition reporting unit, comprising a microprocessor including memory operatively associated therewith, mean connected to said microprocessor for receiving signals indicative of a condition to be reported, means connected to said microprocessor for generating signals for initiating a telephone connection and for transmitting data thereover, and calendar clock means connected to said microprocessor for supplying time signals indicative of date and time of day thereto, said microprocessor including circuit means operable at a predetermined time for initiating a call to a central reporting station and for transmitting data thereto corresponding to said signals indicative of said condition to be reported.

2. Apparatus according to claim 1 wherein said means for receiving signals includes means for receiving a plurality of signals indicative of metered utility usage, and wherein said microprocessor includes circuit means for initiating calls to central reporting stations for each utility at a predetermined time for each of said utilities.

3. Apparatus according to claim 1 wherein said means for receiving signals is adapted for receiving signals indicative of metered electrical power usage, and wherein said microprocessor includes circuit means for recording and totaling on-peak and off-peak electrical power usage, and for transmitting said totaled on-peak and off-peak electrical usage data to a central reporting station at a predetermined time.

4. Apparatus according to claim 1 further including means for receiving alarm signals indicative of an emergency condition to be reported, and wherein said microprocessor includes circuit means operable when an alarm signal is received for initiating a call to an emergency reporting station.

5. Apparatus according to claim 1 wherein said means for generating signals comprises a tone generator.

6. Apparatus according to claim 1 wherein said means for generating signals comprises a pulse train generator.

7. Apparatus according to claim 1 further including keyboard means connected to said microprocessor for data entry thereto, and wherein said microprocessor includes circuit means for initiating a call to a financial institution for establishing communication between said keyboard and said institution.

8. Apparatus according to claim 1 further including means connected for receiving an acknowledgement signal from said central reporting station, and wherein said microprocessor is connectable to said receiving means and includes circuit means for testing receipt by said receiving means of an acknowledgement signal prior to transmitting said data.

9. Apparatus according to claim 1 wherein said means for receiving signals comprises a plurality of input means including means for receiving contact closure signals indicative of metered utility usage, means for receiving contact closure signals indicative of the existance of emergency conditions, and means for receiving coded signals indicative of accumulated metered utility usage, and wherein said microprocessor includes circuit means for scanning said plurality of input means.

10. Apparatus according to claim 1 wherein said microprocessor includes circuit means for transmitting signals indicative of the location of said remote reporting unit.

11. A system for reporting metered utility usage from a plurality of remote usage locations via standard telephone network having a telephone line at each of said remote locations, comprising:

a plurality of remote reporting units, each comprising a microprocessor including memory operatively associated therewith, means connected to said microprocessor for receiving signals from a utility metering device indicative of utility usage to be reported, means connected to said microprocessor and to the telephone line serving the remote location for generating signals for initiating a telephone connection and for transmitting data thereover, means connected to said microprocessor and to the telephone line for receiving acknowledgement signals, and calendar clock means connected to said microprocessor for supplying time signals indicative of date and time of day thereto, said microprocessor including circuit means operable at a predetermined time for initiating a call to a central reporting station and for transmitting thereto signals indicative of the location of said remote reporting unit, and data corresponding to said signals indicative of utility usage; and a central reporting station including means for connection to a telephone line at a central station for receiving telephone calls, means for transmitting acknowledgement signals to remote units calling said central station, means for receiving data from said remote units transmitted over the telephone connection, and means for recording said received data.

* * * * *